Dec. 20, 1955
J. PIANTANIDA
2,727,649
JACKETED FOOD CONTAINER
Filed Nov. 7, 1952
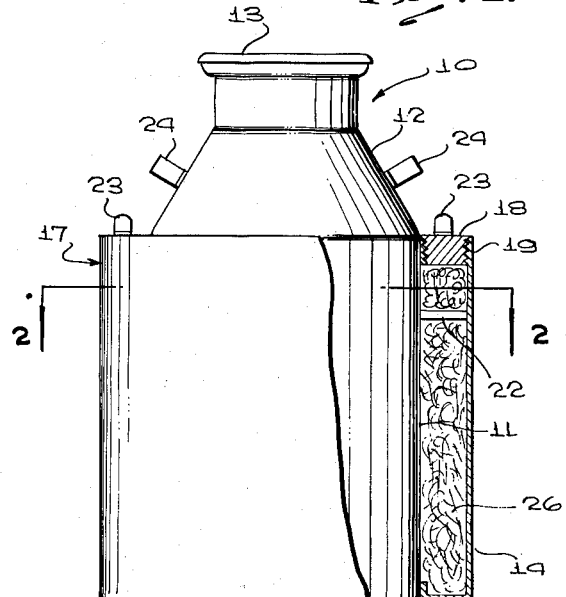
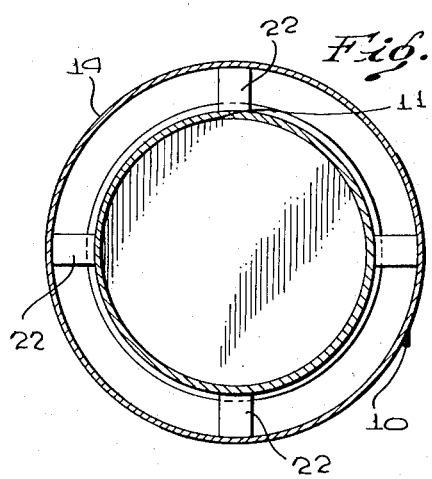
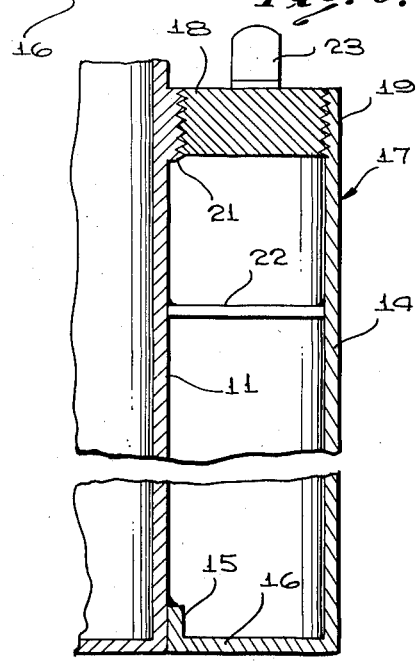
INVENTOR
Joseph Piantanida
BY
McMorrow, Berman & Davidson
ATTORNEYS

United States Patent Office 2,727,649
Patented Dec. 20, 1955

2,727,649

JACKETED FOOD CONTAINER

Joseph Piantanida, San Francisco, Calif.

Application November 7, 1952, Serial No. 319,191

1 Claim. (Cl. 220—10)

This invention relates to food containers, and more particularly, to a jacketed food container.

An object of this invention is to provide a food container for storing an edible food in a chilled condition.

Another object is to provide a jacketed food container for storing an edible food in a chilled condition which may be easily filled and emptied without disturbing the chilling medium.

Another object is to provide a jacketed food container which is portable in nature for storing an edible food in a chilled condition.

Other objects and advantages will become apparent when the following description is read in conjunction with the drawings, wherein:

Figure 1 is an elevational view of a jacketed food container constructed according to the present invention with the jacket partly broken away and in cross section.

Figure 2 is a cross sectional view taken along line 2—2 of Figure 1.

Figure 3 is an enlarged fragmentary view of the food container shown in Figure 1 with the jacket shown in cross section.

Referring now to the drawings, in which like reference numerals are used throughout, the numeral 10 designates generally a food container. The container 10 comprises an upstanding body portion 11 and a neck portion 12 which has one end secured to the body portion 11, the other end being adapted to receive a cap 13. A casing 14, which is shown as a tube, extends the entire height of and surrounds the body portion 11, as shown in Figure 1. The casing 14 has a bottom 16 which is provided with an opening shaped to conformably fit and receive the lower end of the body portion 11. The bottom 16 carries an upstanding flange 15 which is secured to the body portion 11, as by welding shown in Figure 3. The casing 14 and its bottom 16, together with the adjacent wall of the body portion 11, form a jacket 17 which is open at its upper end.

An annular closure 18, conformably shaped to fit the open upper end of the jacket 17, is positioned within the latter end, as shown in Figure 1 and Figure 3. The portion adjacent the upper end 19 of the casing or tube 14 is internally threaded. An externally threaded collar 21 surrounds the body portion 11 contiguous to the neck portion 12 and is secured thereto. As shown in Figure 1 and Figure 3, the closure 18 is exteriorly threaded on both the inner and outer peripheral edges, the threaded portions on the closure 18 being in threaded engagement with the threaded portions on the tube 14 and the collar 21, and together forming interengaging means for detachably securing the closure 18 to the upper end of the jacket 17.

Struts 22, which are arranged within the jacket 17 in spaced relation about the body portion 11, extend between and brace the side wall of the body portion 11 and the casing or tube 14. Upstanding lugs 23 project from the exterior face of the closure 18 and are used to tighten or loosen the closure 18. Handles 24 project from the exterior surface of the neck portion 12 and provide easily accessible means for lifting and moving the food container 10.

In use of the container of this invention, the closure 18 is unscrewed, whereupon the jacket is filled with a chilling medium, such as cracked ice 26, Figure 1, and the closure 18 is then replaced.

The food container thus described is constructed to effectively chill its contents and yet is easily filled, emptied, and transported.

What is claimed is:

A food container comprising an upstanding body portion, a neck portion having one end secured to said body portion and having the other end adapted to receive a cap, a tube extending the entire height of and surrounding said body portion, said tube having a bottom provided with an opening shaped to conformably fit and receive the lower end of said body portion, said bottom being secured to said body portion, said tube and said bottom together with the adjacent wall of said body portion forming a jacket open at its upper end, the portion of the tube adjacent the open end thereof being internally threaded, an externally threaded collar surrounding said body portion contiguous to said neck portion and secured thereto, and an exteriorly threaded annular closure threadedly engaging said internally threaded portion of said tube and said externally threaded collar.

References Cited in the file of this patent

UNITED STATES PATENTS

| | | |
|---|---|---|
| 309,985 | Smith | Dec. 30, 1884 |
| 483,750 | Sexton | Oct. 4, 1892 |
| 712,993 | Carswell | Nov. 4, 1902 |
| 886,836 | Moir | May 5, 1908 |
| 1,008,750 | Steel | Nov. 15, 1911 |
| 1,228,804 | Miller | June 5, 1917 |
| 1,869,756 | Kinard | Aug. 2, 1932 |
| 2,426,475 | Van Frank | Aug. 26, 1947 |

FOREIGN PATENTS

| | | |
|---|---|---|
| 19,724 | Great Britain | Of 1905 |